United States Patent
Madl et al.

(10) Patent No.: US 9,063,672 B2
(45) Date of Patent: Jun. 23, 2015

(54) SYSTEMS AND METHODS FOR VERIFYING MODEL EQUIVALENCE

(75) Inventors: Gabor Madl, St. Louis Park, MN (US); David V. Oglesby, Brooklyn Center, MN (US); Kuntal Chakraborty, Singur (IN); Devesh Bhatt, Maple Grove, MN (US); Stephen Otis Hickman, Maricopa, AZ (US)

(73) Assignee: Honeywell International Inc., Morristown, NJ (US)

( * ) Notice: Subject to any disclaimer, the term of this patent is extended or adjusted under 35 U.S.C. 154(b) by 598 days.

(21) Appl. No.: 13/180,001

(22) Filed: Jul. 11, 2011

(65) Prior Publication Data

US 2013/0019224 A1 Jan. 17, 2013

(51) Int. Cl.
 G06F 9/44 (2006.01)
(52) U.S. Cl.
 CPC ...... *G06F 8/10* (2013.01); *G06F 8/34* (2013.01); *G06F 8/30* (2013.01); *G06F 8/35* (2013.01)
(58) Field of Classification Search
 CPC ............... G06F 8/10; G06F 8/20; G06F 8/36; G06F 8/34; G06F 8/35; G06F 8/24
 See application file for complete search history.

(56) References Cited

U.S. PATENT DOCUMENTS

| | | | |
|---|---|---|---|
| 6,594,783 | B1 | 7/2003 | Dollin et al. |
| 8,056,049 | B2 * | 11/2011 | Bai et al. .................. 717/105 |
| 8,713,528 | B1 | 4/2014 | Conrad et al. |
| 2002/0100022 | A1 | 7/2002 | Holzmann |
| 2003/0014734 | A1 * | 1/2003 | Hartman et al. ............. 717/125 |
| 2004/0169591 | A1 | 9/2004 | Erkkinen |
| 2004/0210873 | A1 | 10/2004 | Tudor |
| 2005/0114841 | A1 | 5/2005 | Moskowitz et al. |
| 2006/0168555 | A1 * | 7/2006 | Represas Ferrao et al. .. 717/104 |
| 2006/0168558 | A1 * | 7/2006 | de Seabra e Melo et al. 717/105 |
| 2006/0225030 | A1 * | 10/2006 | Deffler ..................... 717/104 |

(Continued)

FOREIGN PATENT DOCUMENTS

| | | |
|---|---|---|
| EP | 1684170 | 7/2006 |
| WO | 2012170675 | 12/2012 |

OTHER PUBLICATIONS

Samar Abdi, Functional Verification of System Level Model Refinements, 2005, pp. 14-23 and 39-47.*

(Continued)

*Primary Examiner* — Thuy Dao
*Assistant Examiner* — Mongbao Nguyen
(74) *Attorney, Agent, or Firm* — Fogg & Powers LLC

(57) ABSTRACT

Systems and methods for verifying model equivalence are provided. In one implementation, a system includes: a memory device that stores a reference model (RM) and comparison model (CM), wherein the CM and the RM are constrained by a set of rules; and a processing unit that generates a reference model representation (RMR) from the RM and stores the RMR on the memory device; the processing unit further generates a comparison model representation (CMR) from the comparison model (CM) and stores the CMR on the memory device, wherein the processing unit further to: verifies that the CMR compatibly implements the RMR; verifies that a CM data flow diagram derived from the CMR compatibly implements a RM data flow diagram derived from the RMR; and verifies that every CM semantic unit implements a behavior that corresponds to a RM semantic unit and every RM semantic unit is accounted for in the CM.

20 Claims, 8 Drawing Sheets

(56) References Cited

U.S. PATENT DOCUMENTS

| | | | | |
|---|---|---|---|---|
| 2007/0006130 | A1* | 1/2007 | Stamler et al. | 717/104 |
| 2007/0168925 | A1* | 7/2007 | Bornhoevd et al. | 717/104 |
| 2007/0245297 | A1* | 10/2007 | Kuester et al. | 717/104 |
| 2007/0266366 | A1* | 11/2007 | Bucuvalas | 717/104 |
| 2008/0235655 | A1* | 9/2008 | Defour et al. | 717/104 |
| 2008/0270974 | A1* | 10/2008 | Topchiyski et al. | 717/104 |
| 2009/0070736 | A1* | 3/2009 | Rogers et al. | 717/105 |
| 2009/0100405 | A1* | 4/2009 | Belenky et al. | 717/104 |
| 2009/0125546 | A1* | 5/2009 | Iborra et al. | 707/102 |
| 2009/0172633 | A1* | 7/2009 | Tsyganskiy et al. | 717/104 |
| 2009/0172650 | A1 | 7/2009 | Spurlin | |
| 2009/0178019 | A1* | 7/2009 | Bahrs et al. | 717/104 |
| 2010/0058289 | A1* | 3/2010 | Hudson et al. | 717/105 |
| 2010/0088676 | A1* | 4/2010 | Yuan et al. | 717/120 |
| 2010/0192125 | A1* | 7/2010 | Son et al. | 717/120 |
| 2010/0199257 | A1* | 8/2010 | Biggerstaff | 717/104 |
| 2010/0262953 | A1* | 10/2010 | Barboni et al. | 717/120 |
| 2010/0281455 | A1* | 11/2010 | Anand et al. | 717/104 |
| 2010/0333068 | A1* | 12/2010 | Niimura et al. | 717/125 |
| 2011/0047526 | A1* | 2/2011 | Olkhovich et al. | 717/104 |
| 2011/0078652 | A1* | 3/2011 | Mani et al. | 717/105 |
| 2011/0145783 | A1* | 6/2011 | Seshan et al. | 717/105 |
| 2011/0231823 | A1* | 9/2011 | Fryc et al. | 717/125 |
| 2012/0066661 | A1* | 3/2012 | Balani et al. | 717/104 |
| 2012/0072884 | A1* | 3/2012 | Balko et al. | 717/104 |

OTHER PUBLICATIONS

M. Bechter, Compatibility Models, 2006, pp. 1-7.*
E. James Whitehead, Uniform Comparison of Data Models Using Containment Modeling, 2002, pp. 1-9.*
Joao de Sousa Saraiva, A Reference Model for the Analysis and Comparison of MDE Approaches for Web-Application Development, 2010, pp. 1-6.*
Bhatt, D. et al., "Model-Based Development and the Implications to Design Assurance and Certification", "Digital Avionics Systems Conference", Oct. 30, 2005, pp. 1-14, vol. 2, Publisher: IEEE.
Bhatt et al., "Towards Scalable Verification of Commercial Avionics Software", "Proceedings of the AIAA Infotech@Aerospace Conference", Apr. 2010, pp. 1-8, Publisher: American Institue of Aeronautics and Astronautics, Published in: USA.
Bhatt et al., "HiLITE: An Approach and Tool for Test Generation from Model-Based Functional Requirements", "Presentation—1st International Workshop on Aerospace Software Engineering", May 22, 2007, pp. 1-32, Publisher: Honeywell International Inc.
Buth, "Automated Code Generator Verfication Based on Algebraic Laws", "ProCoS II ESPRIT Basic research 7071", Sep. 1995, pp. 1-23, Publisher: Christian-Albrechts-Universitat Kiel.
Conrad, "Testing-Based Translation Validation of Generated Code in the Context of IEC 61508", "Formal Methods in System Design", Nov. 27, 2009, pp. 389-401, vol. 35, No. 3, Publisher: The MathWorks Inc.
"MATLAB and Simulink", "http://www.mathworks.com/ Accessed May 11, 2011", 1994-2011, p. 1 Publisher: The MathWorks, Inc.
Izerrouken, "Certifying an Automated Code Generator Using Formal Tools: Preliminary Experiments in the Geneauto Project", "European Congress on Embedded Real-Time Software (ERTS)", 2008, pp. 1-10.
Owre, "PVS: A Prototype Verification System", "11th International Conference on Automated Deduction (CADE)", Jun. 1992, pp. 1-6, vol. 607, Publisher: Springer-Verlag.
"Software Considerations in Airborne Systems and Equipment Certification", "http://www.rtca.org", Dec. 1992, pp. 1-112, Publisher: RTCA SC-167 EUROCAE WG-12 DO-178B.
Ryabtsev, "Translation Validation: From Simulink to C", 2009, pp. 1-6.
"SCADE Suite", "http://www.esterel-technologies.com/ Accessed May 11, 2011", 2011, pp. 1-4, Publisher: Esterel Technologies, Inc., Published in: France.
"Simulink Code Inspector", "Accessed from http://www.mathworks.com/products/datasheets/pdf/simulink-code-inspector.pdf", Sep. 1, 2011, pp. 1-4, Publisher: The Mathworks Inc.
European Patent Office, "Office Action", "from Foreign Counterpart of U.S. Appl. No. 13/180,001", filed Dec. 3, 2012, pp. 1-5, Published in: EP.
European Patent Office, "European Search Report", "from Foreign Counterpart of U.S. Appl. No. 13/180,001", filed Nov. 13, 2012, pp. 1-3, Published in: EP.

\* cited by examiner

SYSTEMS AND METHODS FOR VERIFYING MODEL EQUIVALENCE

BACKGROUND

Complexity in modern safety-critical systems is growing at a rapid pace, doubling in size within the span of a decade. Model-based design is increasingly applied to manage this complexity by lifting the level of abstraction from low-level code to the analysis of algorithm designs. To facilitate the transition to model-based design techniques, code generators provide a link from algorithm design to the production of code that executes on a target platform through model transformations. Applied model transformations translate a reference model representation into a translated model representation for analysis, code generation, or other purposes. In certain industries, standards require that the translated model comply with the reference model and require requirements-based tests that provide complete structural coverage. For example, code must validly implement the reference model(s). Further, some standards require a verification process that is fully independent from the design process. Because of these requirements, design and verification tools in such industries can no longer rely on testing-based evaluations of model transformations or simple syntax checkers.

SUMMARY

The Embodiments of the present invention provide methods and systems for verifying model equivalence and will be understood by reading and studying the following specification.

In one embodiment, a system for verifying model equivalence is provided. The system includes at least one memory device configured to store a reference model (RM) and comparison model (CM), wherein the CM and the RM are constrained by a same set of rules; and a processing unit configured to generate a reference model representation (RMR) from the RM and store the RMR on the at least one memory device; the processing unit further configured to generate a comparison model representation (CMR) from the comparison model (CM) and store the CMR on the at least one memory device, wherein the processing unit is further configured to: verify that the CMR compatibly implements the RMR; verify that a CM data flow diagram derived from the CMR compatibly implements a RM data flow diagram derived from the RMR; and verify that all CM semantic units correspond to compatible RM semantic units.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
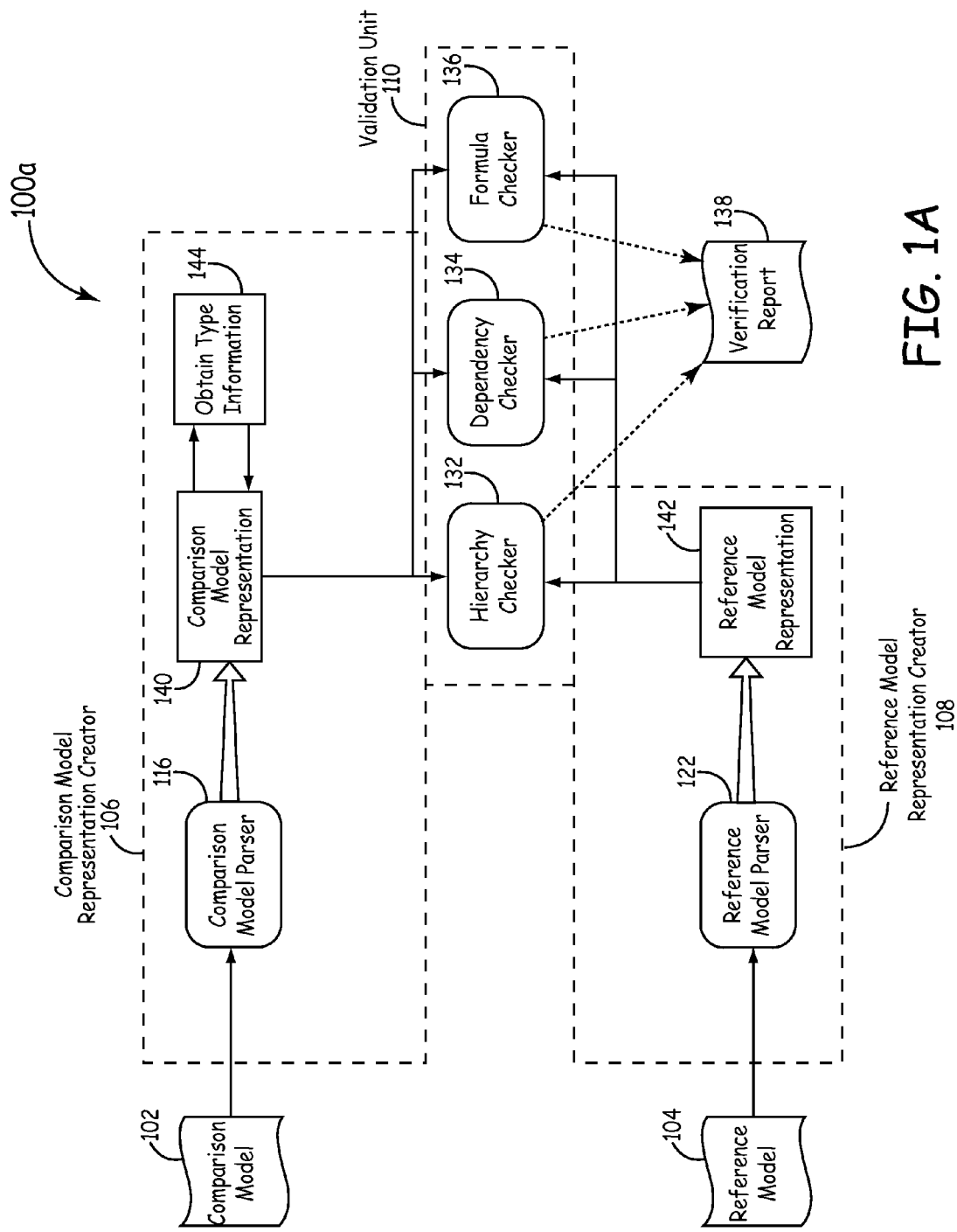
FIG. 1A is a block diagram depicting one embodiment of an automatic model equivalence verification system.

In accordance with common practice, the various described features are not drawn to scale but are drawn to emphasize specific features relevant to the exemplary embodiments.

DETAILED DESCRIPTION

In the following detailed description, references are made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Further, throughout the present disclosure, the following terms when used are intended to have the following meanings. The phrase "source code," as used herein, refers to any fully executable description of a software system. For example, source includes machine code, high-level languages and executable graphical representations of systems. The term "model," as used herein, refers to a system or structure expressed in an artificial language, where the artificial language is defined by a consistent set of rules that are used for interpreting the meaning of components in the system or structure. In the context of a process that transforms an input model into an output model, the phrase "reference model (RM)" refers to the input model and the phrase "comparison model (CM)" refers to the output model. In one implementation, both the reference model and the comparison model are represented by source code.

The phrases "equivalence" and "compatible," as used herein, specifies a relationship between the RM and the CM in which both the RM and CM satisfy the same set of constraints and have the same observable behavior. While the RM and CM are equivalent, certain "compatible" differences may exist between the RM and CM. For example, since a float can be stored as a double, if a constraint requires a float data type in the RM, CM can implement the float data with a double data type and still preserve compatibility. However, if a constraint requires a double data type in the RM, a float implemented in CM is not a compatible implementation of the double data type because a float fails to store a double without a loss of precision or truncation of data. Rules for compatibility may depend on a multitude of factors, including but not limited to, precision, variable types, naming conventions or styles, languages used, etc.

The phrase "model transformation," as used herein, refers to either a manual or automated process that follows a set of rules and guidelines to translate the RM into the CM. The phrase "Code generation," as used herein, is an alternative term used to refer to model transformations, where the CM is expressed in the form of machine readable code. The phrase, "model equivalence verification (MEV)" refers to a process that verifies that a CM is a valid representation of a RM. The phrase "reference model representation (RMR)" refers to a representation of the reference model that is readily used by the model transformation and MEV processes. The RMR representation is typically, but not necessarily, a computer-based representation. The term "comparison model representation (CMR)" refers to a representation of the comparison model that is readily used by the model transformation and MEV processes. The CMR representation is typically, but not necessarily, a computer-based representation. The term "reference model representation creator (RMRC)" refers to a process that follows specific rules to create a RMR from a RM. For example, reading the RM from a file, and creating a machine readable RMR in a computer's memory is one embodiment of a RMRC. The phrase "comparison model representation creator (CMRC)" refers to a process that creates a CMR from the CM following specific rules. In some embodiments, a CMRC includes reading a CM from a file and creating a machine readable CMR in a computer's memory. In some implementations, the RMRC may function like the CMRC with the exception of differences implied as above with reference to the different formats of the RM and CM.

In certain embodiments, a RM captures the design of a software system. To accomplish the abstraction from low-level code to analysis, the RM is described by a modeling language. Examples of a modeling language include MATLAB Simulink/Stateflow, UML, SysML, HUTN, AADL, EMF, MOF, Statecharts, Petri-nets, Kahn Process Networks, Synchronous Data Flow, and the like. Modeling languages are defined by concrete syntax, abstract syntax, semantics, abstract syntax mapping and semantic mapping. Concrete and abstract syntax can be represented textually, graphically, or a combination of both textually and graphically. Semantics can be defined formally through the use of formal languages or formal models of computation or informally, by specifying rules for execution or describing the behavior in a natural human language like English. The abstract syntax mapping describes how the concrete syntax and abstract syntax relate to each other. Finally, the semantic mapping assigns semantic meaning to abstract syntax elements. We refer to abstract syntax elements with assigned semantic meaning as "semantic units".

The concrete syntax of a modeling language specifies how the modeling language represents a reference model in terms of actual characters, letters, or other visual constructs. In contrast to the concrete syntax, the abstract syntax is concerned with the syntax structure. The abstract syntax defines what the elements of the concrete syntax represent. For example, the abstract syntax represents the types of blocks, block attributes, ports expressing hierarchy, and the connections between the blocks and ports. The abstract syntax is concerned about the meaning of the graphical constructs of the concrete syntax, not how they are represented. Further, a concrete syntax representation can be mapped to an abstract syntax representation by the abstract syntax mapping. An abstract syntax representation of the concrete syntax can be in the form of an abstract syntax tree.

The phrases "modeling construct" and "block" are used interchangeably and refer to a semantic unit consisting of a group of one or more declarations and statements. The phrase "abstract syntax tree," as used herein, refers to a tree representation of the abstract syntax of a model. Further, the abstract syntax tree for a reference model is referred to as a "reference model abstract syntax tree (RMAST)" and the abstract syntax tree for a comparison model is referred to as a "comparison model abstract syntax tree (CMAST)". The term "attribute," as used herein, refers to a property of a modeling construct. The phrase "data dependency," as used herein, refers to a modeling construct that references data in a different modeling construct. The phrase "root block," as used herein, refers to a hierarchical modeling construct that may contain other modeling constructs, but is not contained itself within any other modeling construct. The phrase "child block," as used herein, refers to a hierarchical modeling construct that is contained within another modeling construct. The phrase "data flow diagram," as used herein, refers to a representation of the flow of data through a system. The term "formula," as used herein, refers to an algorithmic processing and assignment of data values. The term "domain-specific modeling language (DSML)," as used herein, refers to a modeling language that expresses syntax and semantics. DSMLs commonly support concepts such as hierarchy, inheritance, containment, interface/implementation, relations, and the like. DSMLs describe reference models from a wide range of applications.

Software is increasingly being designed using model-based design methods. Once software is designed in a modeling environment based on a RM, the use of a model transformation changes a RM into a CM. Alternatively, multiple transformations are used to transform a RM into a CM, where the CM is used for another model transformation. For example, multiple transformations are used to analyze different aspects of a RM. One transformation changes the RM into a CM to analyze one set of properties of the RM, while a different transformation changes the RM to analyze a different set of properties of the RM.

In another implementation, the model transformation process functions as a code generator by generating code based on a RM to be implemented on a destination platform. When the model transformation functions as a code generator, the phrases "source code" and "CM" are interchangeable, as generated source code is an embodiment of a CM. For certain platforms, the generated code is verified against the RM to show that the source code complies with the RM. For example, software designed for flight-critical systems in aircraft is certified according to guidelines defined by RTCA DO-178B, and its successor RTCA DO-178C. Further, in some implementations, the verification process must be fully independent of the design process. In the exemplary systems described herein, the CM is verified against the RM by comparing an RMR against a CMR.

Further, unlike syntax based checkers, the exemplary systems described herein are able to comprehend low-level requirements, as described in RTCA DO-178B, even as complexity increases. Syntax-based implementations of MEV generally focus on syntax verification, relying on strict modeling styles, formats, and standards, and the performance of low-level comparisons between the CM and low-level requirements. As complexity increases, syntax-based checkers become unable to comprehend low-level requirements because of their inability to capture the semantics of RMs. Furthermore, if the style or format of the CM changes, a syntax-based checker is unable to compare the new form of the CM with the RM.

Further, model transformation may produce CMs in modeling languages such as the examples of modeling languages described above. Model transformation may also involve code generation. Code generators can generate source code from a RM into programming languages like C, C++, C#, Objective C, Ada, Java, Python, Ruby, HTML, Flash, Prolog, Haskell, and the like. Code can also be generated to run on middleware platforms such as CORBA, J2EE, ICE, SOAP, .NET, COM, RPC, and the like. Code generated may also include bytecode or shell scripts that can readily execute on a target platform, or potentially on a virtual machine such as the Java VM, VMware desktop software, and the like. Code generation is performed by a computer implemented application or through manual source code development performed by a human.

FIG. 1A is a block diagram of one embodiment of an automatic MEV system 100*a*. Automatic MEV system 100*a* verifies that CM 102 and RM 104 are compatible with the same set of rules and constraints. To perform the verification of CM 102, automatic MEV system 100*a* includes a comparison model representation creator (CMRC) 106, a reference model representation creator (RMRC) 108, and a verification unit 110.

In certain embodiments, a modeling language describes RM 104, and modeling tools can store the information describing RM 104 in a native format particular to the modeling language. For example, modeling tools built on MATLAB Simulink store information associated with RM 104 in files having a ".mdl" extension. In certain embodiments, a programming language will describe CM 102. For example, the programming language ANSI C can describe CM 102.

In this embodiment, RMRC 108 receives RM 104 as an input. A RM parser 122 parses RM 104 to create a RMR 142. RM parser 122 is performed either manually or automatically to parse RM 104. RMRC 108 in FIG. 1A stores a representation of RM 104 along with additional data derived from RM 104 in RMR 142. For example, in a specific implementation, RMRC 108 stores data flow diagrams derived from RM 104 in RMR 142. Likewise, CMRC 106 receives CM 102 as an input and a CM parser 116 parses CM 102 to create CMR 140 from CM 102. Verification unit 110 receives the RMR 142 from RMRC 108, receives the CMR 140 from CMRC 106, and compares CMR 140 against RMR 142 to verify that CM 102 is compatible with RM 104.

After RMRC 108 and CMRC 106 create representations of CM 102 and RM 104, verification unit 110 verifies that CM 102 and RM 104 are compatible with one another according to a set of rules by confirming that data dependencies implied by CMR 140 are compatible with the data dependencies implied by RMR 142. To confirm that data dependencies are compatible between CMR 140 and RMR 142, verification unit 110 performs verification processes that include comparisons based on syntactic checks, equivalence checking based on formal languages and logic, simulation trace equivalence, and the like. In one implementation, verification unit 110 performs three processes that include a hierarchy checker 132, a dependency checker 134, and a formula checker 136.

In one implementation, hierarchy checker 132 verifies that the hierarchy and structure of the data flow diagram(s) derived from CM 102 and stored in CMR 140 are compatible with the hierarchy and structure of the model derived from RM 104 and stored in RMR 142. Dependency checker 134 uses the data flow diagrams in CMR 140 and RMR 142 to determine whether dependencies in the two data flow diagrams are compatible. Formula checker 136 verifies that semantic elements of CMR 140 are compatible with the semantic elements of RMR 142. In one embodiment, formula checker 136 verifies that formulas in CM 102 implement expected behavior that corresponds to a block in RM 104. In another embodiment, formula checker 136 verifies that words and sentences in CM 102 formed using a programming language are compatible with words and sentences in RM 104 formed using a domain-specific modeling language.

In some implementations, verification system 100*a* includes obtain type information 144. Obtain type information 144 processes the CMR 140 to obtain type information for variables, attributes, function calls, software structs, and classes. Obtain type information 144 may use the information to annotate the data flow diagrams stored in CMR 140. In one embodiment, the verification processes performed by hierarchy checker 132, dependency checker 134, and formula checker 136 rely on the annotated type information to determine whether semantic elements and data specified by CMR 140 are compatible with semantic elements and data specified by RMR 142.

Figure 1B:
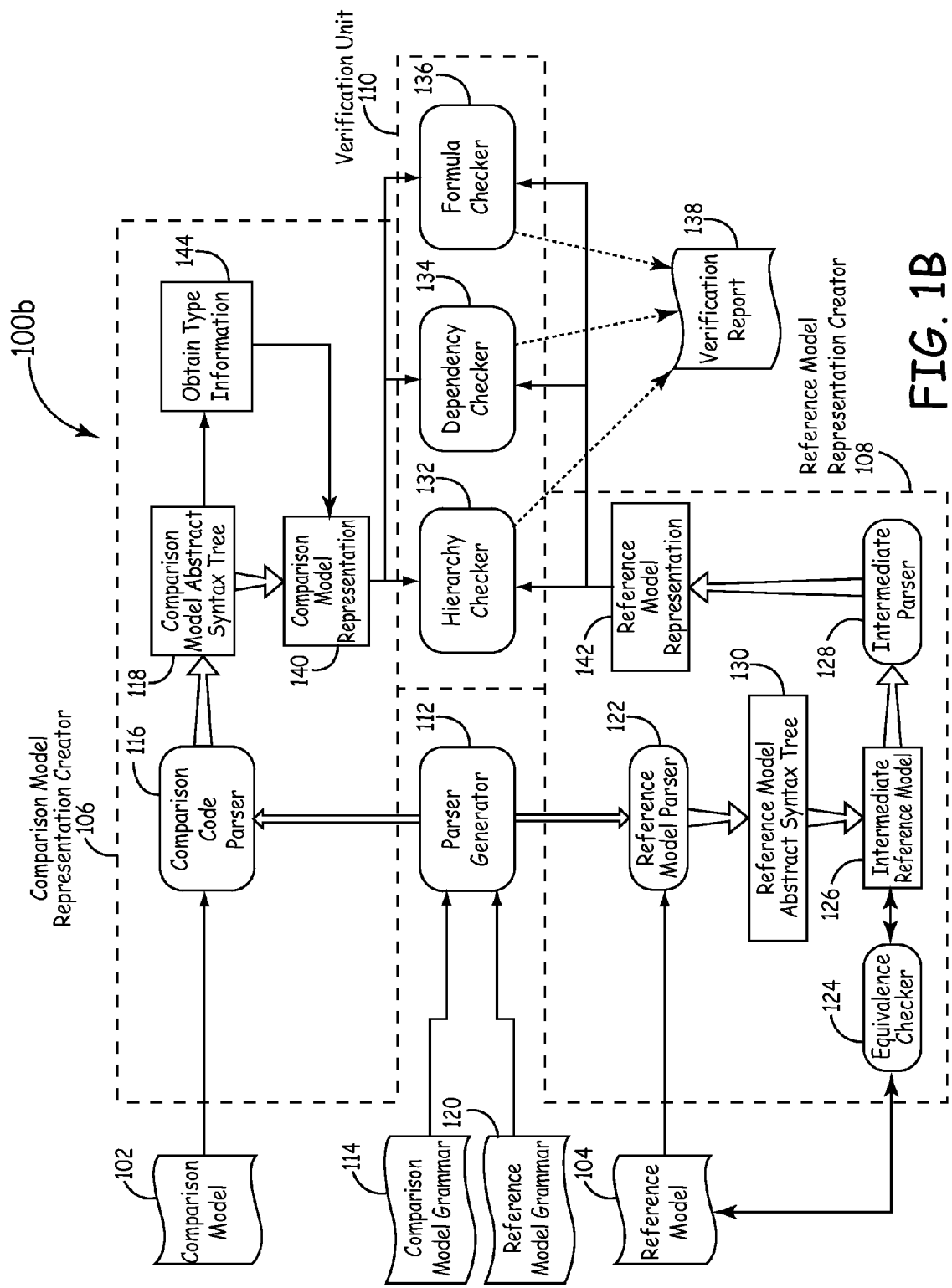
FIG. 1B is a block diagram depicting one embodiment of an automatic model equivalence verification system.

FIG. 1B illustrates a system for verifying source code that implements a parser generator 112 for generating RM parser 122 and CM parser 116 and an intermediate reference model. To create RM parser 122, a parser generator 112 receives RM grammar 120 and generates RM parser 122 based on RM grammar 120. For example, in at least one embodiment, parser generator 112 uses the "ANother Tool for Language Recognition" (ANTLR) parser generator. Parser generator 112 generates a parser for a domain-specific modeling language that is specified by a grammar. For example, when parser generator 112 is an ANTLR parser generator, parser generator 112 generates parsers for languages expressed by an LL* grammar. A parser based on an LL* grammar parses input data from left to right, and constructs the left most derivation of the sentence. Further, parser generator 112 also receives CM grammar 114 in the same manner that parser generator 112 receives RM grammar 120 as described above. In one embodiment, parser generator 112 creates RM parser 122 in RMRC 108 and CM parser 116 in CMRC 106.

In one implementation, CM parser 116 parses CM 102 to create a CMAST 118. CMRC 106 stores CMAST 118 along with additional information in CMR 140. For example, a specific implementation derives data flow diagrams from CMAST 118, and stores the data flow diagram in CMR 140. In one implementation RM parser parses RM 104 to create a RMAST 130. RMRC 108 stores RMAST 130 along with additional information in RMR 142.

In some implementations, the code verification process is independent from the design process by converting RM 104 into an intermediate RM 126. Intermediate RM 126 is stored in a format that is not native to the modeling language, such that it is independent from both reference model 104 and the modeling language that describes reference model 104. For instance, when RM parser 122 parses RM 104 to create RMAST 130, a domain specific modeling language (DSML) can be used to describe RMAST 130. The model described by the DSML can be stored in different formats. In one embodiment, the DSML captures the abstract syntax of RM 104 in an Extensible Markup Language (XML) format.

In at least one embodiment, to convert RM 104 into a non-native format, RM parser 122 also parses and converts RM 104 into intermediate RM 126. In certain standards, to satisfy the independence requirement between the creation of RM 104 and the verification of CM 102, the verification process cannot depend on the design process. To ensure independence of the verification process from the design process, RM parser 122 captures RM 104 created during the design process by converting it into intermediate RM 126 in order to be used for the verification process.

In a further embodiment, an equivalence checker 124 verifies that intermediate RM 126 is an equivalent representation of RM 104. For example, in one implementation, equivalence checker 124 verifies the equivalence of intermediate RM 126 and RM 104 by comparing semantic elements in RM 104 to semantic elements in intermediate RM 126. Further, equivalence checker 124 also functions similarly to verification unit 110. By using an intermediate RM 126 to capture RM 104, the verification of CM 102 is independent of the design process. RMRC 108 further includes intermediate parser 128. Intermediate parser 128 parses intermediate RM 126 and converts it into RMR 142 along with accompanying data flow diagrams. In some implementations, intermediate parser 128 may store RMAST 130, intermediate RM 126, and accompanying data flow diagrams in RMR 142. Verification unit 110 uses the data stored in CMR 140 to verify that CM 102 is compatible with RM 104.

Figure 2:
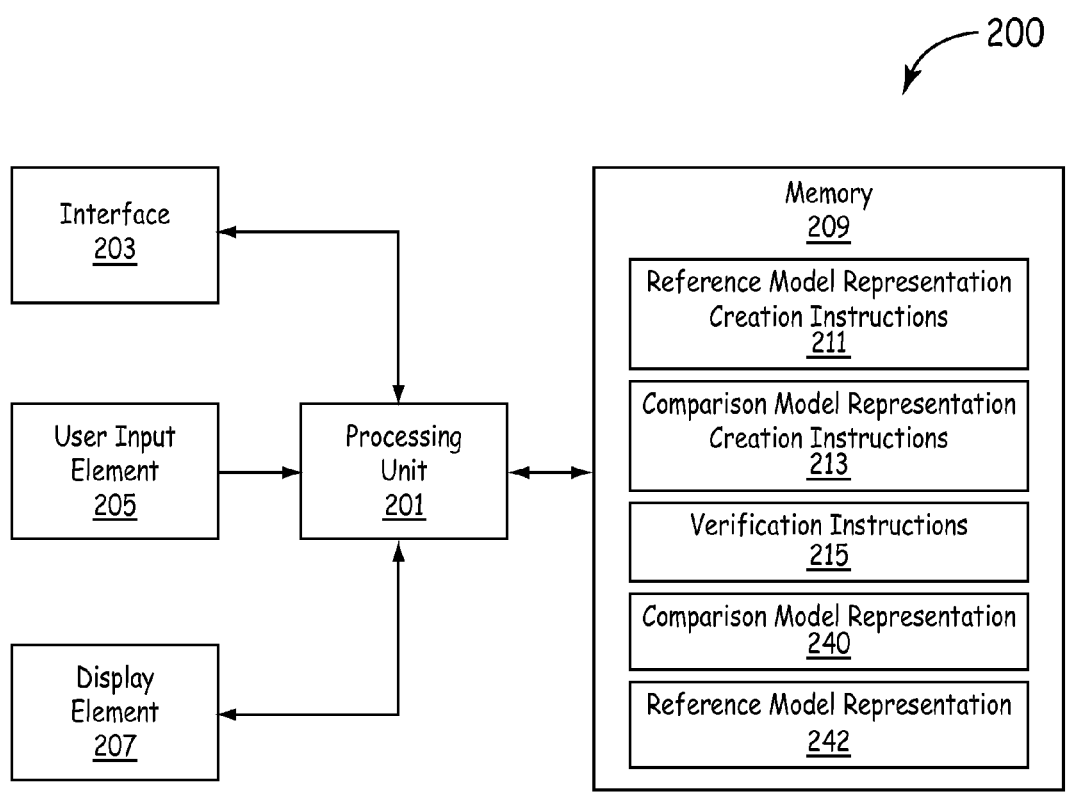
FIG. 2 is a block diagram depicting one implementation of the exemplary automatic model equivalence verification system of FIG. 1A.

FIG. 2 is a block diagram depicting one embodiment of a system 200 for implementing an automatic source code verification system. System 200 includes a processing unit 201 having one or more processors and a memory 209 having one or more memory devices. Processing unit 201 includes at least one electronic device that accepts data and performs mathematical and logical operations. For example, processing unit 201 can operate on a standalone computer accepting data and performing mathematical and logical operations. Alternatively, processing unit 201 could operate on a server, where the server accesses CM 102 from a version control system. To perform the mathematical and logical operations, processing unit 201 reads instructions from memory 209. Memory 209 includes at least one device that can hold data in a machine readable format. Memory 209 can be read only memory, random access memory, flash memory, flip-flops, and the like. As was stated, memory 209 stores executable instructions for directing the execution of processing unit 201. For example, memory 209 stores reference model representation creator (RMRC) instructions 211, comparison model representation creator (CMRC) instructions 213, and verification instructions 215. RMRC instructions 211 direct processing unit 201 to create a RMR of a RM 104 and store it in RMR 242 in memory 209 along with potential data flow diagrams or other data derived for RMR 242. CMRC instructions 213 direct processing unit 201 to create a CMR from a CM and store the CMR in CMR 240 in memory 209 along with potential data flow diagrams or other data derived for CMR 240. Verification instructions 215 instruct processing unit 201 to run processes that verify that CM 102 is compatible with RM 104.

In some implementations, processing unit 201 also connects to at least one of interface 203, user input element 205, and display element 207. Interface 203 interfaces processing unit 201 with one or more other devices which provide the source code, reference models and/or grammar to the processing unit 201 for verifying that a CM is compatible with a RM. Interface 203 also provides a way to output the results of the verification process. For example, the results can be output to a printer via interface 203. User input element 205 allows a user to direct the operation of processing unit 201. For example, a user may select a RM and accompanying CM for verification. Display element 207 receives data from processing unit 201 and displays the data to a user. For example, display element 207 can display the results of the verification process to a user through a communicative medium like an on-screen message, a paper printout, music, Braille, and the like. Alternatively, display element 207 could also comprise a web server, where the web server receives data from processing unit 201 and displays the received data on the internet, communicates the data to a user through email communications, and the like.

The processing unit 201 includes or functions with software programs, firmware or other computer readable instructions for carrying out various methods, process tasks, calculations, and control functions, used in the implementing the functionality described above. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CDROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 3:
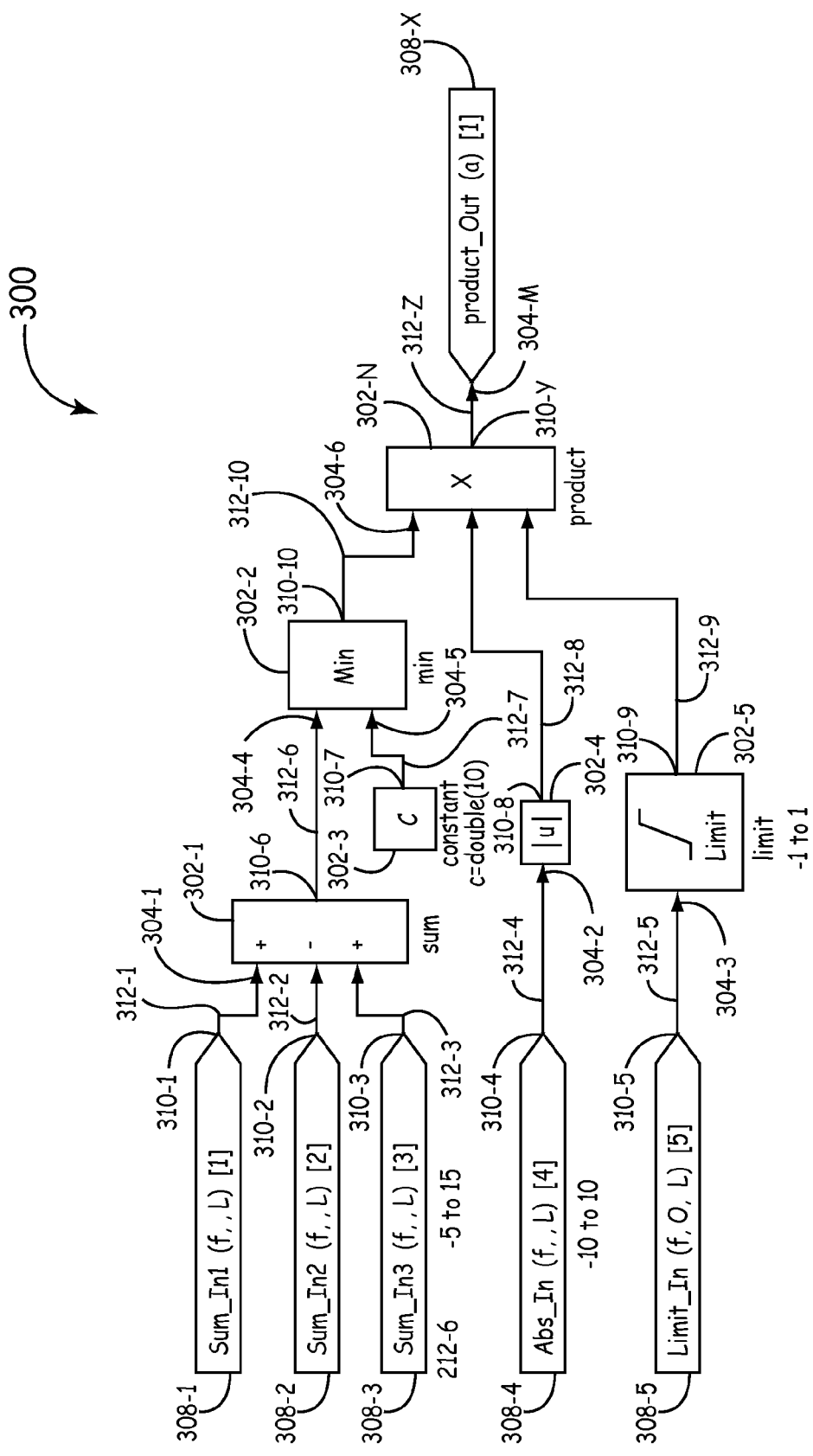
FIG. 3 is a block diagram depicting one embodiment of the concrete syntax of a reference model.

FIG. 3 provides an illustration of a concrete graphical syntax representation of a RM 300 according to one embodiment. In particular, RM 300 is an implementation of RM 104 in FIG. 1, where the concrete syntax of RM 300 is shown in a graphical modeling language. As shown in RM 300, the concrete syntax provides a visual representation of the system. In RM 300, the concrete syntax consists of blocks (302-1 . . . 302-N), input ports (304-1 . . . 304-M), output ports (310-1 . . . 310-Y), connections (312-1 . . . 312-Z), and boundaries (308-1 . . . 308-X). Blocks (302-1 . . . 302-N) represent segments of the system that algorithmically manipulate data. Input ports (304-1 . . . 304-M) represent inputs through which blocks (302-1 . . . 302-N) receive data. Output ports (310-1 . . . 310-Y) represent outputs through which blocks (302-1 . . . 302-N) transmit data. Connections (312-1 . . . 312-Z) specify dependencies and data flow from output ports (310-1 . . . 310-Y) to input ports (304-1 . . . 304-M) and of blocks (302-1 . . . 302-N). Boundaries (308-1 . . . 308-X) are ports that correspond to the boundary between the system represented by RM 300 and the environment of RM 300.

Figure 4:
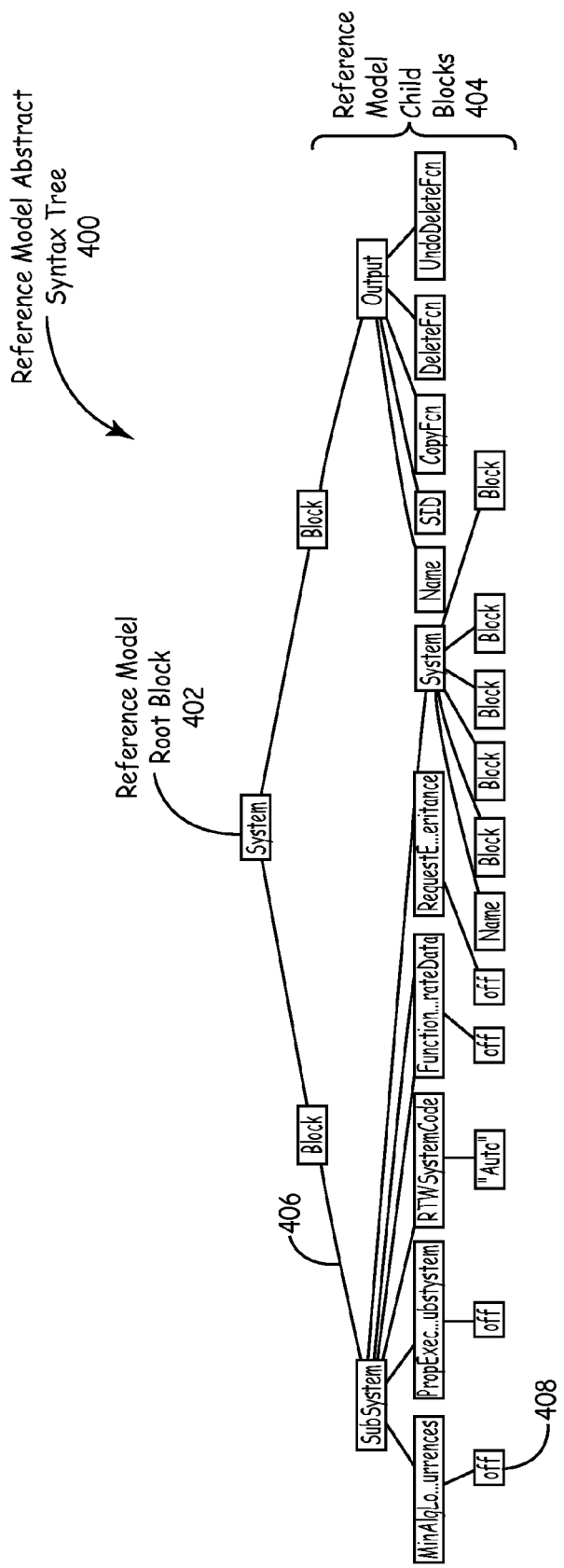
FIG. 4 is a block diagram depicting one embodiment of a reference model abstract syntax tree.

FIG. 4 is a block diagram showing one embodiment of a RMAST 400. RMAST 400 is an example of RMAST 130 in FIG. 1. RMAST 400 contains a RM root block 402, RM child blocks 404, and connections 406 that specify the relationships of the RM child blocks 404 with the other blocks. RM root block 402 represents the system containing the SIMULINK model shown in FIG. 3. RM child blocks 404 represent the syntax of the model, and correspond to the following elements: blocks 302 in FIG. 3, input ports 304, output ports 310, and boundaries 308. Connections 406 represent data dependencies between RM child blocks 404 and either other RM child blocks 404 or RM root block 402. Moreover, in some embodiments, the children of RM child blocks 404 represent attributes of the elements shown in FIG. 3. For example, exemplary attribute 408 is a leaf in the RMAST and represents an attribute of a RM child block 404.

Figure 5:
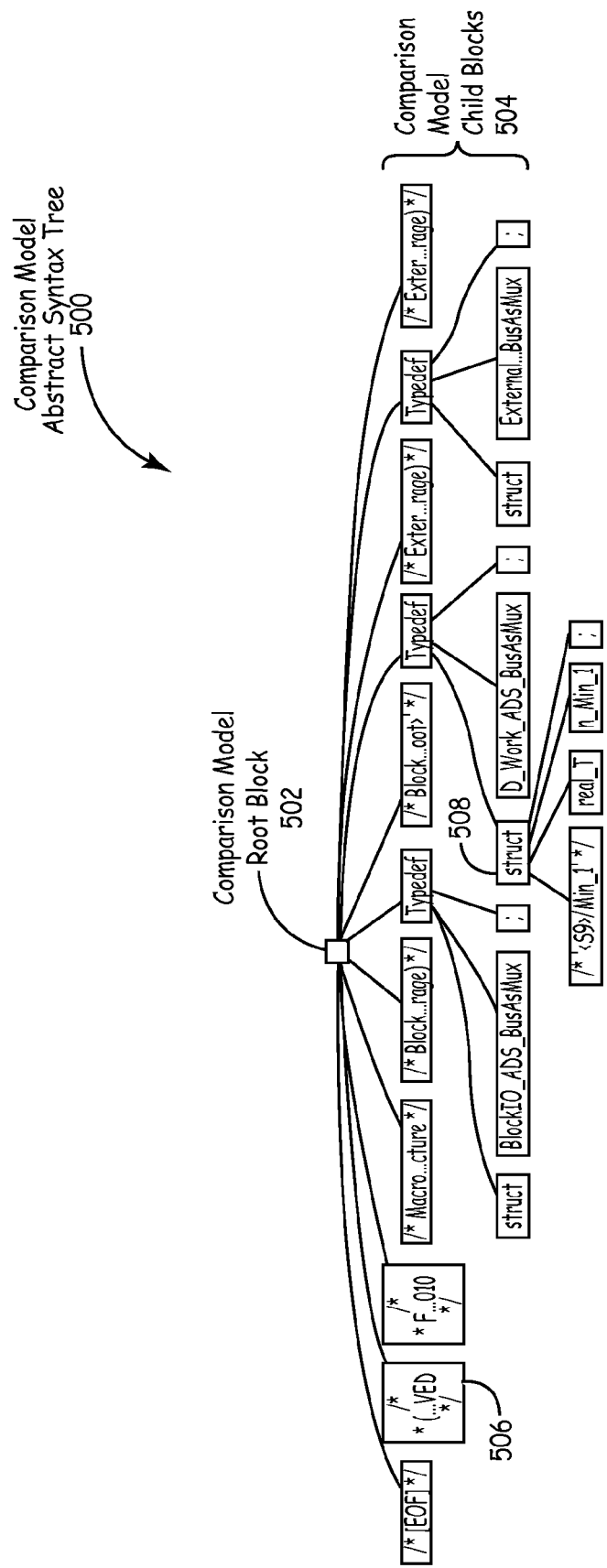
FIG. 5 is a block diagram depicting one embodiment of a comparison model abstract syntax tree.

FIG. 5 is a block diagram showing one embodiment of a CMAST 500. CMAST 500 is an example of an implementation of CMAST 118 in FIG. 1. Similar to the RMAST 400 in FIG. 4, CMAST 500 in FIG. 5 includes a CM root block 502 and CM child blocks 504. Further, CMAST 500 includes representations of data structures, such as exemplary struct 508, and comments, such as exemplary comment 506.

Figure 6:
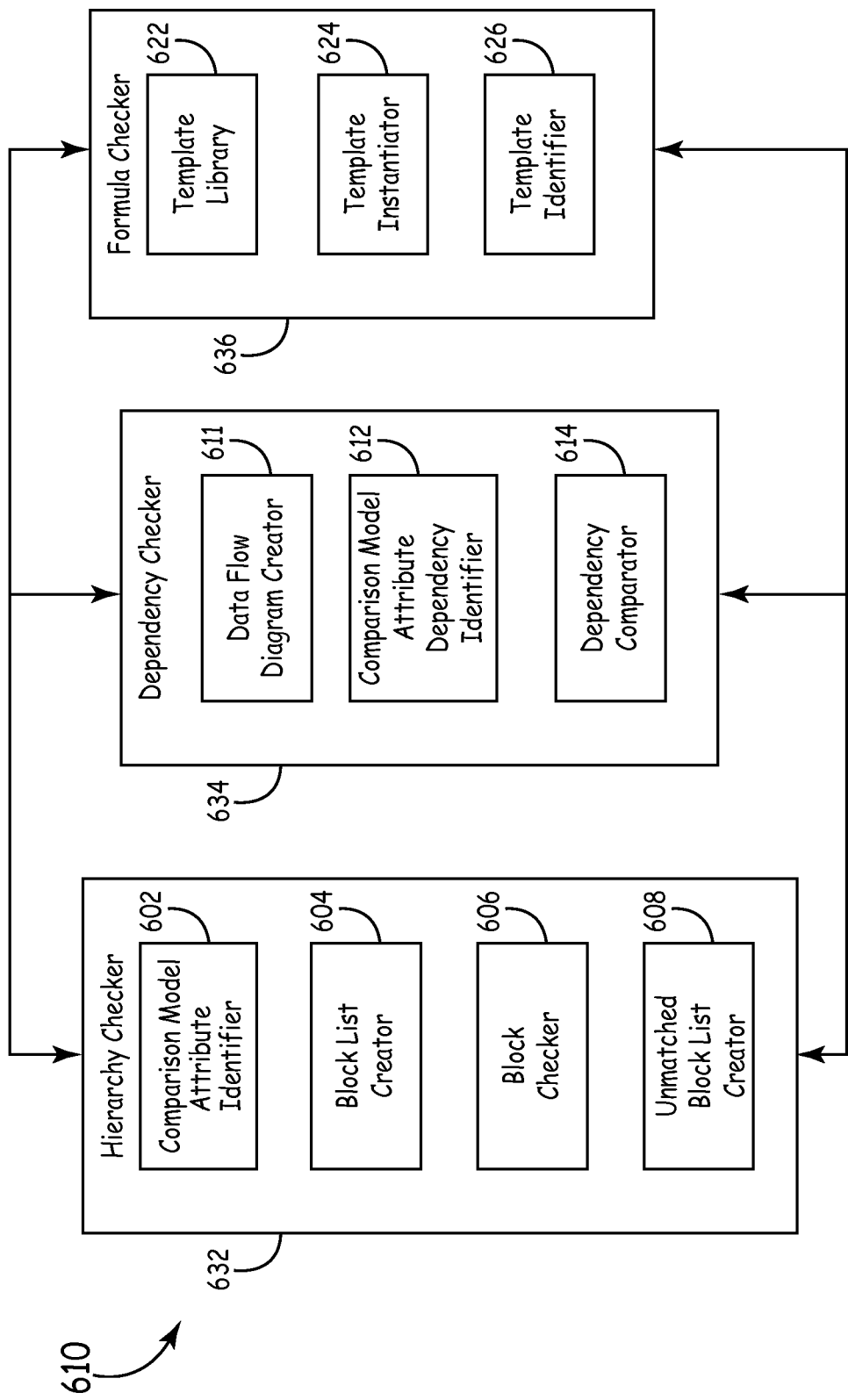
FIG. 6 is a block diagram depicting one embodiment of a verification unit.

FIG. 6 is a block diagram illustrating a verification unit 610, verification unit 610 being an implementation of verification unit 110 in FIG. 1 according to one embodiment. Similar to verification unit 110, verification unit 610 includes a hierarchy checker 632, a dependency checker 634, and a formula checker 636.

In certain implementations, verification unit 610 is used to verify that source code generated from a design model is compatibly equivalent to the reference design model. When the RM is a design model and the CM is source code, hierarchy checker 632 includes a comparison model attribute identifier 602. Comparison model attribute identifier 602 is configured to identify attributes from a comparison model 102 in FIG. 1, such as source code. CM attribute identifier 602 processes a CMR 102 to identify data types. Verification unit 110 uses the identified data types to compare attribute information in CMR 140 to attribute information in RMR 142. For example, CM attribute identifier 602 processes type definition declarations and stores the declarations internally as attribute types such as type name, qualifiers (const, volatile), signedness (signed, unsigned), storage qualifiers (extern, static, auto), array dimensions if the attribute is defined as array, address and pointer modifiers, and the like. Structs, unions, and other composite types are also supported through the use of scopes. The term "scope," as used herein, represents a specific scope in which attribute types and attribute declarations are active. For example, attributes declared within a struct will have their scope embedded within the struct scope. All type definition declarations are represented as an attribute type object. In some implementations, the type definition declarations are obtained by obtain type information 144. In further implementations, the type definitions are stored internally in a balanced tree structure. The attribute class stores attribute names, values, and the type of the attribute. CM attribute identifier 602 flexibly represents the type system and processes type information present in CMR 140 natively.

Hierarchy checker 632 further includes a block list creator 604. A list is a potential representation for ordered collections, but other data structures may also be used for this step, including, but not limited to trees, hash maps, linked lists, etc. To identify the blocks in both RM 104 and CM 102, block list creator 604 creates a RM block list from RMR 142 and a CM block list from CMR 140. By identifying the blocks in RMR 142 and the blocks in CMR 140, block list creator 604 creates a list of the blocks contained in RM 104 and CM 102. Hierarchy checker 632 further includes a block checker 606 that verifies that the hierarchical position of each block in the RM block list is compatible with the hierarchical position of at least one block in the CM block list. In one implementation, block checker 606 may check that all parent and child nodes for a given block are compatible matches. In some implementations, special circumstances can arise where a block is not represented in either the RM block list or the CM block list. Block checker 606 can make exceptions for these special circumstances that do not hinder the behavior of the CM or RM. For example, Mux/Demux blocks may be encoded as arrays and iterators, and certain blocks in MATLAB Simulink are strictly display related—i.e. store text boxes only. If compatibility cannot be established, the difference is reported through verification report 138.

In one embodiment, block checker 606 verifies that the functionality associated with a RM block name in the CM block list created by block list creator 604 is compatible with the functionality associated with at least one CM block name in the CM block list created by block list creator 604. Further, block checker 606 creates a RM block child list comprising the types of each RM child block of the RM block represented by the RM block type. Block checker 606 also creates a CM block child list comprising the types of each CM child block of a CM block represented by the CM block type. A CM child block has data dependencies on designated CM blocks. Block checker 606 verifies that the functionality of each RM child block represented in the RM block child list is compatible with a CM block child in the CM block child list and verifies that attributes associated with the CM block type are compatible with attributes associated with the CM block type. Attributes have relationships that exist for some or all instances of a block and are directly associated with a block. In one implementation of block checker 606, block checker 606 walks through the structure of the RMR 142 and the CMR 140, and verifies that the types and functionality of blocks and children blocks of the RMR 142 are compatible with the blocks and children blocks of the CMR 140.

In certain implementations, block checker 606 verifies that the functionality associated with the types of blocks in the CMR 140 is compatible with the functionality associated with block types in RMR 142. Alternatively, block checker 606 can use a mapping table to verify that CMR 140 is compatible with RMR 130. Hierarchy checker 632 also includes an unmatched block list creator 608 that creates an unmatched block list, where the unmatched block list contains a list of RM blocks that fail to be compatible with a CM block in the CM block list and a list of CM blocks that fail to be compatible with at least one block in the RM, block list.

Hierarchy checker 632 deals with inherent complexities in the identification of matching blocks in RMR 142 and CMR 140. One source of complexity is code generators that rely on sophisticated code optimizations. Code optimizations can distort the structure of CM 102 with respect to a RM 104. To overcome the complexity arising from optimizing compilers, the hierarchy checker 632 keeps track of the types of blocks present in both the RMR and CMR, and maintains a list of expected attribute types and values for each block. Cases where code is not necessarily generated are explicitly defined for verification, and information describing the explicitly defined cases are stored and communicated to hierarchy checker 632. Hierarchy checker 632 helps determine whether the lack of source code is an error, or an expected result of code optimization. Further, hierarchy checker 632 also checks for corner cases such as empty blocks, non-existent observation points, etc. that may instruct the compiler not to generate code where the occurrences do not hinder the operation of code. Also, hierarchy checker 632 checks for certain types of blocks that have no associated generated code. For example, some blocks that act as multiplexers/demultiplexers and blocks that determine how data traverses through a model may not generate code. Hierarchy checker 632 is not concerned with dependencies between the blocks, as the constraints created by dependencies are verified by dependency checker 634.

As was mentioned above, verification unit 610 also includes dependency checker 634. Dependency checker 634 includes a data flow diagram creator 611 that populates the data flows from CM 102 and RM 104 in CMR 140 and RMR 142 respectively. Dependency checker 634 then verifies that data flow diagrams created from CM 102 are compatible with data flow diagrams created from RM 104. Dependency checker 634 includes a CM attribute dependency identifier 612 configured to create an attribute dependency list, where the attribute dependency list identifies data dependencies within CM 102. In at least one embodiment, CM attribute dependency identifier 612 identifies CM functions; separates CM 102 into segments based on units with semantic meaning (delimiters, sentences, words, and the like); creates a list of CM data dependencies; identifies a type for each token, where a token is a basic grammatically indivisible unit of language in a CM segment that represents a keyword, operator, or identifier. Further, CM attribute dependency identifier 612 identifies a data dependency within the CM segment and saves the data dependency in the list of CM data dependencies.

In some implementations, dependency checker 634 converts RM 104 into a data flow diagram, where vertices represent block attributes, and edges correspond to the connections within RM 104. Further, CM 102 implies a partial ordering on the attributes declared within CM 102. For example, assignment operators imply a precedence relationship between the source and destination of the operator. Dependency checker 634 obtains the partial ordering of attributes implied by CM 102. At the end of the execution by dependency checker 634, an attribute dependency list contains all source/destination pairs for dependencies, and specifies all partial orderings between attributes identified by CM attribute identifier 602.

The following code example can be used to illustrate how dependency checker 634 obtains the partial ordering of attributes according to one embodiment using the ANSI C programming language:

```
1:   #include <stdio.h>;
2:   main( ) {
3:       int a, b = 1, c = 2, d, e =3, f=4;
4:       a = b + c;
5:       d = e + f;
6:       printf("%d %d", a, d);
7:   }
```

The assignment operator '=' implies a precedence relationship in both lines 4 and 5. In order to assign a value to a, both b and c must already be initialized. Moreover, the value of a depends on both the value of b and c. However, there is no dependency relationship implied between either b or c. Likewise, in line 5 we determine that d depends on e and f, and there is no dependency relationship between e and f. Moreover, we also recognize that a and d are completely independent, therefore there is no dependency relationship between any elements of sets {a; b; c} and {d; e; f}. The partial ordering implied by the example shown in the above code example can be summarized as a set: {a→b, a→c, d→e, d→f}.

Further, RMR 142 explicitly contains information on the RM connections. Each connection is defined between block attributes. Dependency comparator 614 of dependency checker 634 iterates through connection entries obtained from RMR 130 and cross checks the connection entries with the attribute dependency list to verify that the dependencies are the same and there are no contradicting constraints, where a contradictory constraint occurs when the dependency for a block in RM 104 is different than the dependency for an equivalent CM segment in CM 102. If there are no contradicting constraints, dependency checker 634 has successfully verified that the data flow diagrams of RM 104 are compatible with the data flow diagrams of CM 102.

Additionally, verification unit 610 includes formula checker 636. Formula checker 636 includes a template library 622 that stores a plurality of templates, as well as their potential mapping to semantic units in CM 102. For example, in one implementation, template library 622 may contain a formula in the form A=B+C with a potential mapping to a "sum" block in a reference model. Templates are typically set before the MEV analysis begins. However, they may also be dynamically added to the library during the MEV process by template instantiator 624 that may create and modify templates in template library 622. Also, formula checker 636 includes template identifier 626 that identifies templates in the template library 622 corresponding to semantic units in RM 104. Template library 622 may potentially specify one-to-many mappings for templates; in other words, a single template represents multiple semantic units in a reference model. For example, the template A=B*C represents multiplication, gain, or a square function. In such cases, formula checker 636 identifies the correspondence of semantic units in RM 104 and CM 102. A potential implementation builds on hierarchy checker 632 to show correspondence of semantic elements between RM 104 and CM 102. If the type of the semantic unit from CM 102 is defined as a potential match in template library 622, and correspondence was established between the semantic units, then equivalence is shown. In at least one embodiment, template identifier 626 also separates RM 104 into a plurality of RM segments based on semantic units (such as words, sentences, and delimiters, and the like) and matches each RM segment in the plurality of RM segments to a template stored in template library 622.

Formula checker 636 attempts to prove that the formulas employed within source code 104 are compatible with the expected behavior of low-level blocks. The term "formula," as used herein, refers to an algorithmic processing on an assignment of data values. For example, "A=B+C" represents a formula where A is assigned the value of B added with C. Formula checker 636 builds on template library 622. For each model block, a set of templates is defined. The template contains possible sequences of formulas and variable locations. A template can be instantiated by inserting variable names in the variable locations, where the variable locations indicate the location of a variable throughout the CM 102. After instantiation, the template defines an algorithmic formula that implies a specific processing on the variables, including assignment of values.

Similar to dependency checker 634, formula checker 636 breaks up CM 102 through the use of semantic units such as lines, sentences, words, delimiters, and the like. Template identifier 626 then tries to match templates from template library 622 to the semantic units. Template identifier 626 uses the attribute hierarchy information obtained by the hierarchy checker 632 to identify the type of the block analyzed within the semantic unit. Using the block type information, template identifier 626 identifies the set of templates that are applicable to that specific type of block. If the template matches CM 102, the compatibility is proved. For example, a formula template represented by "A=B+C" will match the formula implementation "class.attr1=class2.attr2+gain", as the formula template matches the semantic meaning of the elements. Likewise the above formula template also matches "class.attr1=gain+class2.attr2". If the formula template does not match the formula implementations in source code, then the validity test fails. In a further implementation, template identifier is able to identify combinations of templates. For example, the statement "A=B*(C+D)" is a combination of templates "A=B+C" and "A=(B*C)" In order to be applicable to code generated using optimizing compilers, template library 622 remains flexible, and able to express dynamic changes in code, such as loop rolling. Therefore, rather than being only a syntactic check, the template matching involves a semantic check to prove the compatibility.

As described above, verification unit 610 performs the above mentioned three checks or combination thereof on RMR 130 and CMR 118 in conjunction with the corresponding data flow diagrams stored in internal comparison model representation 140 and internal reference model representation 142. In particular, hierarchy checker 632, dependency checker 634, and formula checker 636 or a combination thereof compare different aspects of CMR 140 and RMR 142. When hierarchy checker 632, dependency checker 634, and formula checker 636 identify differences between the RMR 142 and the CMR 140, the differences are transmitted to and stored in verification report 138. Verification report 138 stores the differences so that they can be read by a user or other computing system. In some implementations, verification report 138 indicates what portions of comparison model 102 were not able to be automatically verified against the reference model 104 so that a user, upon analyzing verification report 138 can manually verify those sections. In certain embodiments, as hierarchy checker 632, dependency checker 634, and formula checker 636 identify the differences between CM 102 and RM 104 and report the differences to verification report 138, the absence of differences in verification report 138 verifies that CM 102 is compatible with RM 104.

Figure 7:
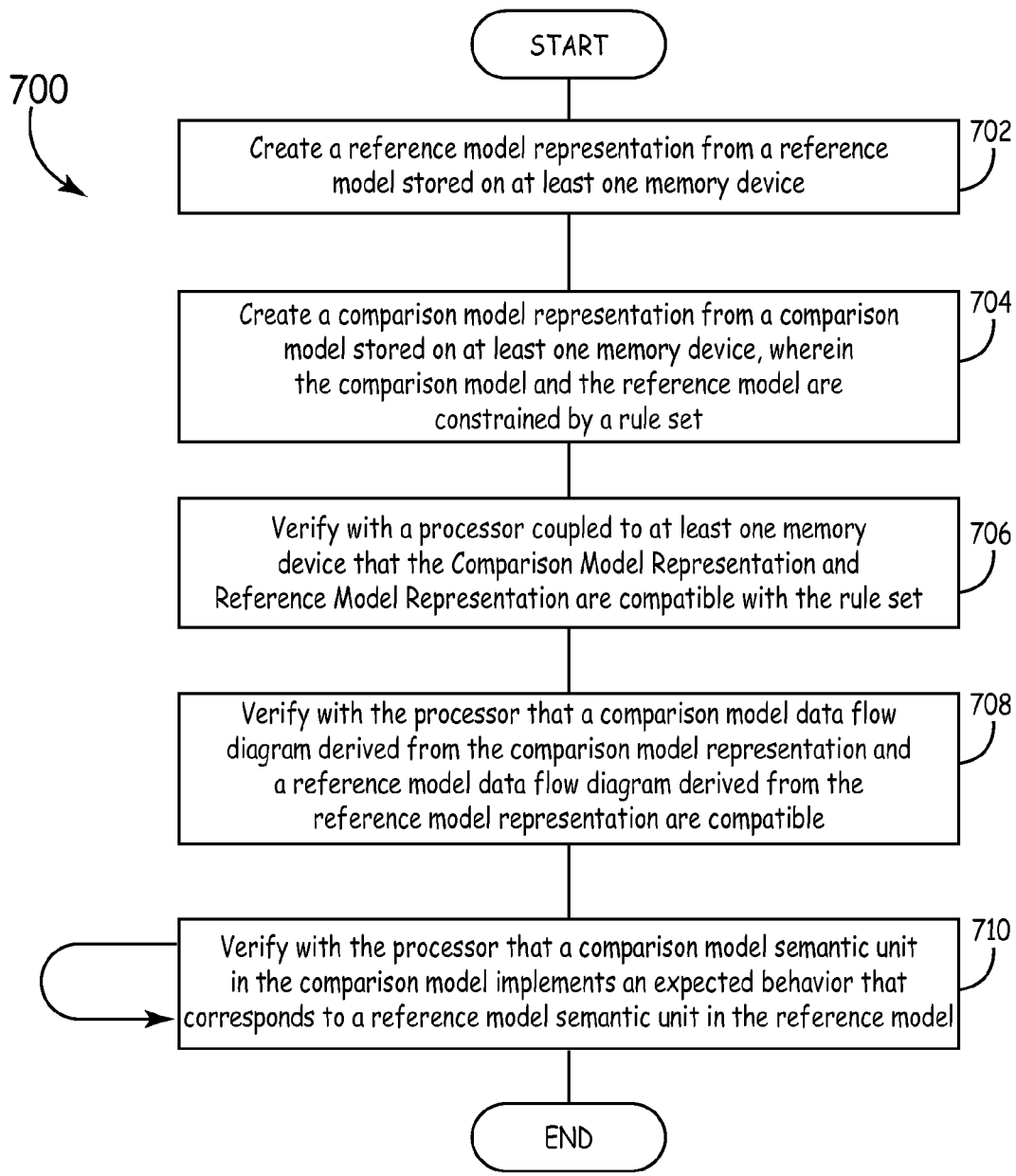
FIG. 7 is a flow chart depicting one embodiment of a method for verifying that a comparison model and a reference model are compatible.

FIG. 7 is a flowchart depicting an exemplary model verification method 700, which is used to verify that a CM is compatible with a RM. Method 700 can be implemented by automatic model equivalence verification system 100a described above. At act 702, a RMR is created from an RM stored on at least one memory device as described above in relation to FIGS. 1-4. For example, in one embodiment, a RM parser parses a RM to capture the abstract syntax and stores the captured abstract syntax as a RMR. At act 704, a CMR is created from a CM stored on at least one memory device, wherein the CM and the RM are constrained by a rule set as described above in relation to FIGS. 1 and 5. For example, a CM parser parses a CM to capture the abstract syntax and stores the captured abstract syntax as a CMR.

A verification unit verifies that the data flow diagrams derived from the RMR are compatible with the data flow diagrams derived from the CMR. The verification unit includes a hierarchy checker, a dependency checker, and a formula checker. At act 706, a processor verifies whether the CMR and the RMR are compatible with the rules set. In one embodiment, the verification of whether the CMR compatibly implements the RMR is described above in relation to the hierarchy checker 632 in FIG. 6. Act 708 verifies whether a CM data flow diagram derived from the CMR and a RM data flow diagram derived from the RMR are compatible. In one embodiment, the verification of whether a CM data flow diagram compatibly implements a RM data flow diagram is described above in relation to dependency checker 634 in FIG. 6. Act 710 verifies whether a CM semantic unit in the CM implements an expected behavior that corresponds to a RM semantic unit in the RM. In some implementations, act 710 is repeatedly performed until the compatibility of each CM semantic unit and RM semantic unit is verified. In one embodiment, the verification of formulas in the CM is described above in relation to formula checker 636 in FIG. 6.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed:

1. A method for verifying model compatibility, the method comprising:
   creating a reference model representation (RMR) from a reference model (RM) stored on an at least one memory device;
   creating a comparison model representation (CMR) from a comparison model stored on the at least one memory device, wherein the comparison model and the reference model are constrained by a same set of rules;
   verifying with a processor coupled to the at least one memory device that the CMR and the RMR are compatible according to the same set of rules;
   verifying with the processor that a CM data flow diagram derived from the CMR and a RM data flow diagram derived from the RMR are compatible with one another;
   verifying with the processor that all CM semantic units implement expected behaviors that correspond to RM semantic units; and
   verifying that all RM semantic units are accounted for in the CM.

2. The method of claim 1, wherein verifying that the CMR and the RMR are compatible comprises:
   processing the CM to identify attributes;
   identifying a CM root block of the CMR;
   identifying a RM root block of the RMR;
   identifying the child blocks of both the CM root block and the RM root block;
   comparing the identified child blocks of the CM root block with the identified child blocks of the RM root block; and
   verifying that the attributes of the CM root block are compatible with the attributes of the RM root block.

3. The method of claim 1, wherein verifying that the CM data flow diagram and RM data flow diagrams are compatible further comprises:
   identifying data dependencies in the CM; and
   comparing the data dependencies with the RM dependencies in the RMR.

4. The method of claim 1, wherein verifying with the processor that a CM semantic unit in the CM implements an expected behavior that corresponds to a RM semantic unit in the RM further comprises:
   defining a plurality of templates;
   dividing the CM into a plurality of CM segments based on a semantic unit;
   comparing each CM segment in the plurality of CM segments to at least one template in the plurality of templates, each template containing formula sequences and variable locations associated with the CM segment; and
   determining that the CM implements the RM when each CM segment matches one of the plurality of templates.

5. A system for verifying model equivalence, the system comprising:
   at least one memory device configured to store a reference model (RM) and comparison model (CM), wherein the CM and the RM are constrained by a same set of rules; and
   a processing unit configured to generate a reference model representation (RMR) from the RM and store the RMR on the at least one memory device; the processing unit further configured to generate a comparison model representation (CMR) from the comparison model (CM) and store the CMR on the at least one memory device, wherein the processing unit is further configured to:
     verify that the CMR and the RMR are compatible according to the same set of rules;
     verify that a CM data flow diagram derived from the CMR and a RM data flow diagram derived from the RMR are compatible with one another;
     verify that all CM semantic units implement expected behaviors that correspond to RM semantic units; and
     verify that all RM semantic units are accounted for in the CM.

6. The system of claim 5, wherein the processing unit is further configured to:
   identify attributes from the CM;
   create a RM block list from the RMR and create a CM block list from the CMR;

verify that each RM block name in the RM block list is compatible with a CM block name in the CM block list; and create an unmatched block list, wherein the unmatched block list contains a list of RM block names that fail to be compatible with a CM block name in the CM block list and a list of CM block names that fail to be compatible with at least one RM block name in the RM block list.

7. The system of claim 6, wherein the processing unit is further configured to:

verify that functionality associated with CM block names in the CM block list is compatible with the functionality associated with RM block names in the RM block list;

create a RM block child list comprising the names of each RM child block of a RM block represented by the RM block name;

create a CM block child list comprising the names of each CM child block of a CM block represented by the CM block name;

verify that functionality associated with each RM child block in the RM block child list is compatible with functionality associated with a CM block child in the CM block child list; and verify that attributes associated with the RM block name are compatible with attributes associated with the CM block name.

8. The system of claim 5, wherein the processing unit is further configured to:

create an attribute dependency list on the at least one memory device, wherein the attribute dependency list identifies data dependencies within the CM; and compare attribute dependencies within the attribute dependency list with data dependencies in the RMR.

9. The system of claim 8, wherein the processing unit is further configured to:

identify CM functions;

separate the CM into segments based on a semantic unit;

identify a token type in a segment; and identify a data dependency within the segment and save the data dependency in the attribute dependency list.

10. The system of claim 5, wherein the processing unit is further configured to:

store a plurality of templates in a template library on the at least one memory device, wherein a template in the template library contains RM semantic units and variable locations implemented in the RM;

create and modify templates in the template library; and identify templates in the template library in the CM.

11. The system of claim 10, wherein the processing unit is further configured to:

separate the CM into a plurality of segments based on CM semantic units;

match a segment in the plurality of segments to a template stored in the template library.

12. The system of claim 5, wherein the processing unit is configured to report differences between the CM and the RM.

13. A program product comprising a non-transitory processor-readable medium on which program instructions are embodied, wherein the program instructions are configured, when executed by at least one programmable processor, to cause the at least one programmable processor to:

verify that a comparison model representation (CMR) is compatible with a reference model representation (RMR), wherein the RMR is generated from a reference model (RM) and the CMR is generated from a comparison model (CM), wherein the CM and the RM are compatible according to the same set of rules;

verify that a CM data flow diagram derived from the CMR and RM data flow diagram derived from the RMR are compatible with one another;

verify that all CM semantic units implement expected behaviors that correspond to RM semantic units; and verify that all RM semantic units are accounted for in the CM.

14. The program product of claim 13, wherein the program instructions are further configured to cause at least one programmable processor to:

identify attributes from the CM;

create a RM block list from the RMR and create a CM block list from the CMR;

verify that each RM block name in the RM block list is compatible with a CM block name in the CM block list; and create an unmatched block list, wherein the unmatched block list contains a list of RM block names that fail to be compatible with a CM block name in the CM block list and a list of CM block names that fail to be compatible with at least one RM block name in the RM block list.

15. The program product of claim 14, wherein the program instructions are further configured to cause at least one programmable processor to:

verify that functionality associated with CM block names in the CM block list are compatible with functionality associated with RM block names in the RM block list;

create a RM block child list comprising the names of each RM child block of a RM block represented by the RM block name;

create a CM block child list comprising the names of each CM child block of a CM block represented by the CM block name;

verify that functionality associated with each RM child block in the RM block child list is compatible with a functionality associated with a CM block child in the CM block child list; and verify that attributes associated with the RM block name are compatible with attributes associated with the CM block name.

16. The program product of claim 13, wherein the program instructions are further configured to cause at least one programmable processor to:

create an attribute dependency list, wherein the attribute dependency list identifies data dependencies within the CM; and compare attribute dependencies within the attribute dependency list with data dependencies in the RMR.

17. The program product of claim 16, wherein the program instructions are further configured to cause at least one programmable processor to:

identify CM functions;

separate the CM into CM segments based on a semantic unit;

identify a token type in a CM segment; and identify a data dependency within the CM segment and saves the data dependency in the attribute dependency list.

18. The program product of claim 13, wherein the program instructions are further configured to cause at least one programmable processor to:

store a plurality of templates in a template library, wherein a template in the template library contains RM semantic units and variable locations implemented in the RM;

create and modify templates in the template library; and identify templates in the template library in the CM.

19. The program product of claim 18, wherein the program instructions are further configured to cause at least one programmable processor to:
  separate the CM into a plurality of CM segments based on semantic units;
  match a CM segment in the plurality of CM segments to a template stored in the template library.

20. The program product of claim 13, wherein the program instructions are further configured to cause at least one programmable processor to report differences between the CM and the RM.

* * * * *